United States Patent
Altintas et al.

(10) Patent No.: US 10,257,695 B2
(45) Date of Patent: *Apr. 9, 2019

(54) WIRELESS COMMUNICATION DEVICE AND WIRELESS COMMUNICATION METHOD

(71) Applicant: Toyota Jidosha Kabushiki Kaisha, Toyota-shi, Aichi (JP)

(72) Inventors: Onur Altintas, Tokyo (JP); Ryokichi Onishi, Tokyo (JP); Mitsuhiro Nishibori, Tokyo (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,258

(22) Filed: Apr. 27, 2018

(65) Prior Publication Data

US 2018/0249323 A1    Aug. 30, 2018

Related U.S. Application Data

(63) Continuation of application No. 14/241,787, filed as application No. PCT/JP2012/071847 on Aug. 29, 2012, now Pat. No. 9,986,422.

(30) Foreign Application Priority Data

Aug. 30, 2011  (JP) .................................. 2011-187753
Mar. 30, 2012  (JP) .................................. 2012-078924

(51) Int. Cl.
  *H04M 3/00*  (2006.01)
  *H04W 8/22*  (2009.01)
  (Continued)

(52) U.S. Cl.
  CPC .............. *H04W 8/22* (2013.01); *G06F 17/30* (2013.01); *H04W 4/00* (2013.01); *H04W 4/40* (2018.02);
  (Continued)

(58) Field of Classification Search
  CPC .... H04B 7/165; H04B 14/006; H04B 1/0483; H04B 3/54; H04B 14/02; H03C 3/02;
  (Continued)

(56) References Cited

U.S. PATENT DOCUMENTS 7,737,896 B1   6/2010  Sun et al.
8,295,859 B1  10/2012  Yarkan
(Continued)

FOREIGN PATENT DOCUMENTS

JP    2007-13352   1/2007
JP    2008-205817  9/2008
(Continued)

OTHER PUBLICATIONS

J. He et al., "Design and Experimental Evaluation of Context-Aware Link-Level Adaptation," IEEE INFOCOM 2012, Orlando, FL, Mar. 25-30, 2012.

(Continued)

*Primary Examiner* — Anthony S Addy
*Assistant Examiner* — Matthew W Genack
(74) *Attorney, Agent, or Firm* — Finnegan, Henderson, Farabow, Garrett & Dunner, LLP

(57) ABSTRACT

A wireless communication device capable of changing a communication parameter to be used according to a surrounding situation includes a learning database that stores, in association with each other, the surrounding situation of the wireless communication device and a communication performance in a case where communication is performed by using a given communication parameter, a plurality of (Continued)

sensors, surrounding situation determination unit configured to determine the surrounding situation of the wireless communication device from information obtained from the plurality of sensors, communication parameter candidate determination unit configured to refer to the learning database to determine candidates for the communication parameter that are appropriate in the determined surrounding situation, communication parameter determination unit configured to determine the communication parameter used in communication from among the candidates determined by the communication parameter candidate determination unit based on the requirement of the communication, and wireless communication unit configured to perform communication by using the communication parameter determined by the communication parameter determination unit. With this, it is possible to select an appropriate communication parameter according to the surrounding situation of the wireless communication device.

7 Claims, 11 Drawing Sheets

(51) Int. Cl.

| | | |
|---|---|---|
| *G06F 17/30* | (2006.01) | |
| *H04W 28/18* | (2009.01) | |
| *H04W 4/40* | (2018.01) | |
| *H04W 4/00* | (2018.01) | |
| *H04W 16/14* | (2009.01) | |
| *H04W 84/18* | (2009.01) | |
| *H04W 64/00* | (2009.01) | |

(52) U.S. Cl.
CPC ............ *H04W 28/18* (2013.01); *H04W 16/14* (2013.01); *H04W 64/003* (2013.01); *H04W 64/006* (2013.01); *H04W 84/18* (2013.01)

(58) Field of Classification Search
CPC ....... H03D 3/007; H04J 1/20; H04L 27/0004; H04L 27/00; H04L 27/0008; H04L 27/06; H04L 5/007
USPC ........ 370/204, 206, 215; 375/259, 268, 271, 375/300, 302, 320, 322; 455/23, 42, 44, 455/102, 110, 210
See application file for complete search history.

(56) References Cited

U.S. PATENT DOCUMENTS

| | | |
|---|---|---|
| 2003/0003922 A1 | 1/2003 | McClure |
| 2004/0204026 A1 | 10/2004 | Steer et al. |
| 2005/0190782 A1 | 9/2005 | Buckley et al. |
| 2005/0254435 A1 | 11/2005 | Moakley et al. |
| 2006/0259951 A1 | 11/2006 | Forssell et al. |
| 2008/0200121 A1 | 8/2008 | Yamamoto |
| 2009/0049159 A1 | 2/2009 | Boscovic et al. |
| 2010/0184440 A1 | 7/2010 | Mao et al. |
| 2010/0312432 A1 | 12/2010 | Hamada |
| 2011/0009151 A1 | 1/2011 | Miucic |

FOREIGN PATENT DOCUMENTS

| | | |
|---|---|---|
| JP | 2010-136291 | 6/2010 |
| JP | 2010-154234 | 7/2010 |
| JP | 2011-166286 | 8/2011 |

OTHER PUBLICATIONS

J. Camp et al., "Context-aware Collection, Decision, and Distribution (C2D2) Engine for Multi-Dimensional Adaptation in Vehicular Networks," VANET '11, Las Vegas, NV, Sep. 23, 2011.

FIG. 2
(A) METHOD FOR ACQUIRING HISTORICAL DATA
ACQUIRE FROM COMMUNICATION RESULT OF HOST VEHICLE
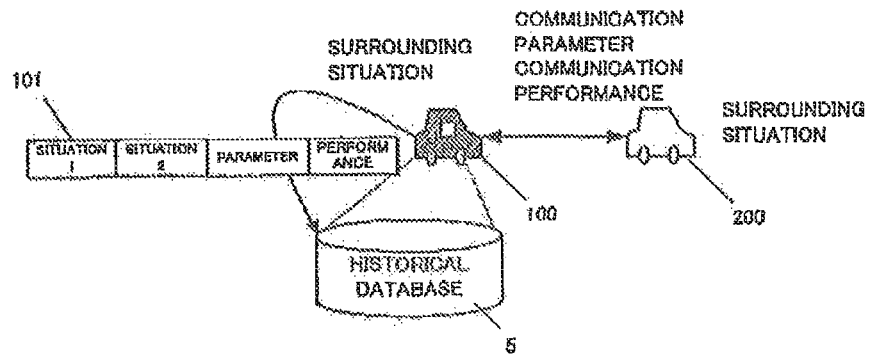
(B) METHOD FOR ACQUIRING HISTORICAL DATA
ACQUIRE FROM COMMUNICATION RESULT OF OTHER VEHICLES
ACQUIRE FROM COMPUTER SIMULATION RESULT
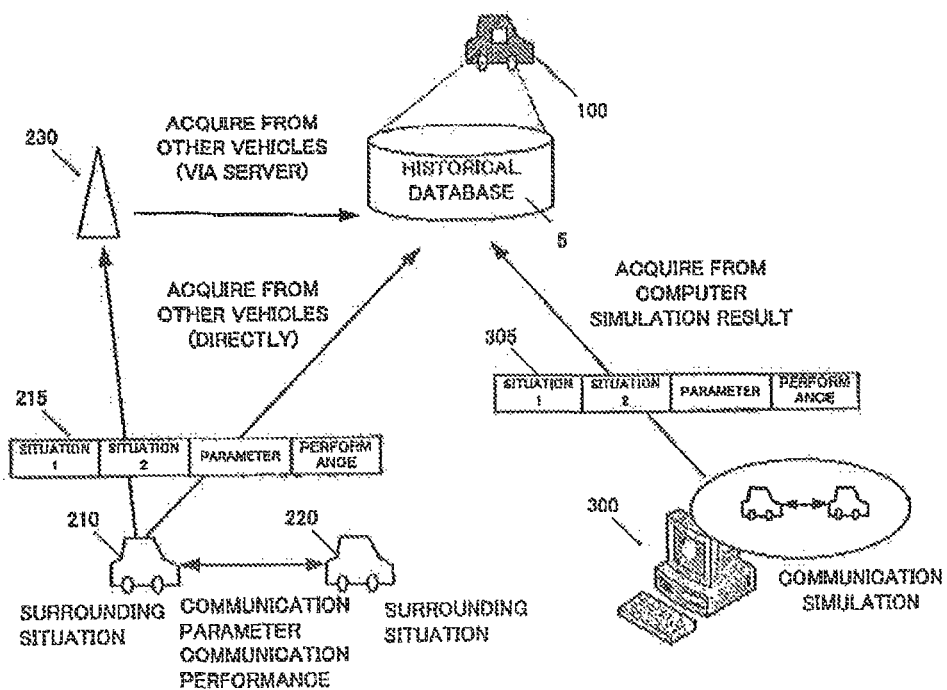

WIRELESS COMMUNICATION DEVICE AND WIRELESS COMMUNICATION METHOD

CROSS-REFERENCE TO RELATED APPLICATIONS

This application is a continuation of U.S. patent application Ser. No. 14/241,787, which is a national phase application of International Application No. PCT/JP2012/071847, filed Aug. 29, 2012, the contents of each which are incorporated herein by reference.

TECHNICAL FIELD

The present invention relates to wireless communication technology, and particularly relates to wireless communication technology for determining an appropriate way of communication in consideration of the surrounding situation and the requirement of an application.

BACKGROUND ART

In order to enhance frequency use efficiency, advances are made in the study of cognitive wireless communication in which a wireless communication device recognizes and identifies the surrounding radio wave environment, and adaptively changes a frequency and a radio system for use in wireless communication. In the cognitive wireless communication, the wireless communication device autonomously and actively detects and uses available frequencies (PTL 1).

However, there is no existing study on determining which part of the detected available frequencies (white space) to use.

In addition, in a case where the wireless communication device moves at high speed such as a vehicular wireless network, the radio wave environment significantly changes. Consequently, even in a case where the same frequency and the same radio system are used, it is necessary to adaptively change communication parameters and the like in order to maintain communication performance. Although it is known that the wireless communication performance significantly depends on the surrounding situation (context), there is no existing study other than a study that a few communication parameters are adaptively changed based on limited information on the surrounding situation.

CITATION LIST

Patent Literature

PTL 1: Japanese Patent Application Laid-open No. 2010-136291

SUMMARY OF INVENTION

Technical Problem

As the number of sensors mounted on a vehicle increases, more information on the surrounding situation can be obtained. However, the above-described prior art can only optimize limited communication parameters and lacks scalability for optimizing more communication parameters.

An object of the present invention is to provide a technology for selecting the appropriate communication parameter according to the surrounding situation of the wireless communication device.

Technical Solution

The wireless communication device of the present invention changes the communication parameter to be used according to the surrounding situation by the following configuration. That is, the wireless communication device of the present invention includes a learning database that stores, in association with each other, a surrounding situation of a first wireless communication device, a predetermined communication parameter, and a communication performance in communication in a case where the communication is performed between the first communication device and a second communication device by using the predetermined communication parameter, a plurality of sensors, surrounding situation determination means for determining a surrounding situation of a host device from information obtained from the plurality of sensors, communication parameter determination means for referring to the learning database to determine candidates of the communication parameter that are appropriate in the surrounding situation of the host device, and wireless communication means for performing communication by using the communication parameter determined by the communication parameter determination means.

In the learning database, the surrounding situation of the transmitting wireless communication device (first wireless communication device), the communication parameter used in communication, and the communication performance in the communication are stored. Learning data stored in the learning database may be data generated based on the communication actually performed by the host device, and may also be data generated based on the communication performed by other wireless communication devices. In addition, the learning data may also be generated not from the actually performed communication but from the result of simulation.

By adopting the learning database described above, it is possible to derive the communication performance from the surrounding situation on the transmitting wireless device and the communication parameter. That is, if the surrounding situation on the transmitting wireless device is found out, it is possible to determine the communication parameter that optimizes the communication performance.

It is preferable to determine which communication parameter is adopted according to the requirement of the application that performs the communication ultimately. Consequently, in the present invention, the communication parameter determination means preferably determines candidates for the communication parameter that are appropriate in the surrounding situation of the host device, and preferably determines the communication parameter used in communication from among the candidates based on the requirement of the communication.

In the present invention, as the communication parameter, one or a plurality of the communication parameters related to each of a transport layer, a network layer, a data link layer, and a physical layer can be used. Subsequently, the communication parameter determination means determines the appropriate candidate for each parameter corresponding to the surrounding situation. Examples of the communication parameter include choice of protocol (connection orientation) and congestion window in the transport layer.

Examples thereof include communication connection mode, routing scheme, and routing metric in the network layer. Examples thereof include contention window and choice of MAC system (CSMA, TDMA, or FDMA) in the data link layer. Examples thereof include modulation coding system, MIMO scheme, bandwidth, used frequency, transmission rate, and transmission power in the physical layer. However, in the present invention, the communication parameter to be adjusted may be any communication parameter, and the communication parameter other than those mentioned above may be changed according to the surrounding situation. In addition, instead of changing the communication parameters related to all of the transport layer, the network layer, the data link layer, and the physical layer, the communication parameter related to a part of the layers may also be changed.

The wireless communication device according to the present invention can be a vehicle-mounted wireless communication device mounted on a vehicle. Herein, the vehicle-mounted wireless communication device includes not only the wireless communication device provided in the vehicle but also the wireless communication device that can be brought into the vehicle and is capable of acquiring information from the plurality of sensors for determining the surrounding situation. For example, the vehicle-mounted wireless communication device includes the wireless communication device capable of connecting with an in-vehicle network via wired or wireless connection to acquire information from various sensors of the vehicle.

In addition, in the present invention, as sensor information for determining the surrounding situation, it is preferable to use at least one of the location, speed, and acceleration of the vehicle, and the number of surrounding vehicles. The location of the vehicle can be obtained from a GPS device. In addition, the location information obtained from the GPS device may be corrected by matching information obtained from a gyroscope or a vehicle speed sensor with map information. Note that the location information may indicate not only latitude/longitude information but also any of an urban area, a suburban area, and a rural area, and any of a highway, a national road, and a general road. These information items can be obtained by combining the GPS information with the map information. The speed and acceleration of the vehicle can be obtained from a speed sensor and an acceleration sensor. The number of surrounding vehicles can be obtained by the wireless communication means and an in-vehicle camera. For example, in a case where the individual vehicles perform communication periodically, it is possible to grasp the number of surrounding vehicles by receiving the communication. In addition, the number of surrounding vehicles may also be acquired by performing image processing on images obtained from the in-vehicle camera of the host vehicle. Further, in a case where a roadside unit grasps the number of vehicles using a camera or the like and notifies via wireless communication, it is also possible to grasp the number of surrounding vehicles by receiving the notification. Note that, as the sensor information, various information items such as distances with surrounding vehicles or obstacles, rainfall, brightness, and the remaining amount of fuel or a battery can be used for determining the surrounding situation in addition to the information items described above.

Further, in the present invention, the wireless communication device preferably further includes historical information storage means for storing, in association with each other, the communication parameter and the communication performance of the communication performed by the wireless communication means and the current surrounding situation of the host device as historical information, and historical information transmission means for transmitting the historical information stored in the historical information storage means to a server device.

Furthermore, in the present invention, the wireless communication device preferably further includes historical information storage means for storing, in association with each other, the communication parameter and the communication performance of the communication performed by the wireless communication means and the current surrounding situation of the host device as historical information, historical information transmission means for transmitting the historical information stored in the historical information storage means to a server device, and historical information communication means for receiving the historical information accumulated in the server device.

Thus, the communication parameter actually used by the wireless communication device and the communication performance in the communication are stored in association with each other, accumulated in the server device, and distributed to other wireless communication devices, whereby it is possible to collect and accumulate the historical information to determine the appropriate communication parameter with excellent accuracy.

In the present invention, it is also preferable to determine the communication parameter in consideration of not only the surrounding situation of the host device but also the surrounding situation of a wireless communication device of a communication partner. In this case, the wireless communication device according to the present invention preferably further includes communication partner surrounding situation acquisition means for acquiring the surrounding situation from the wireless communication device of the communication partner, the learning database preferably further stores a surrounding situation of the second wireless communication device in association with the communication performance in the communication, and the communication parameter determination means preferably refers to the learning database to determine the communication parameter that is appropriate in the surrounding situations of the host device and the communication partner.

Note that the wireless communication device of the "communication partner" of which the surrounding situation is to be acquired is not necessarily limited to one wireless communication device. For example, in a case where broadcast or multicast communication is performed to a plurality of the wireless communication devices, there are a plurality of the wireless communication devices of the "communication partners". However, even in this case, it is not necessary to acquire the surrounding situations of all of the communication partners, and the communication parameter may also be determined from the surrounding situations of a part of the communication partners.

Thus, since the appropriate communication parameter is determined in consideration of the surrounding situations of the wireless communication devices on both sides that perform communication, it is possible to determine the communication parameter that is more appropriate than the communication parameter in a case where the communication parameter is determined in consideration of the surrounding situation of one of the wireless communication devices.

Note that the present invention can be considered as the wireless communication device having at least a part of the means described above. In addition, the present invention can also be considered as a wireless communication method that execute the above processes, or a program for implementing the method. The present invention can be constituted by combining as much as possible the means and processes described above with each other.

Advantageous Effects of Invention

According to the present invention, it is possible to select an appropriate communication parameter according to the surrounding situation of the wireless communication device.

BRIEF DESCRIPTION OF DRAWINGS

FIG. 2 is a view for explaining a method for acquiring historical data in the first embodiment.

DESCRIPTION OF EMBODIMENTS

With reference to the drawings, preferred embodiments of the present invention will be described in detail by way of example.

First Embodiment

A wireless communication device according to the present embodiment determines a surrounding situation (context) from sensor information and selects appropriate communication parameters corresponding to the context to perform communication. Note that, in the present embodiment, a description will be given by using a vehicle-mounted wireless communication device mounted on a vehicle as an example. However, the present invention is not limited to the vehicle-mounted wireless communication device, and may be implemented as a wireless communication device mounted on any mobile unit, a portable wireless communication device, or a stationary wireless communication device.

<Configuration>

Figure 1:
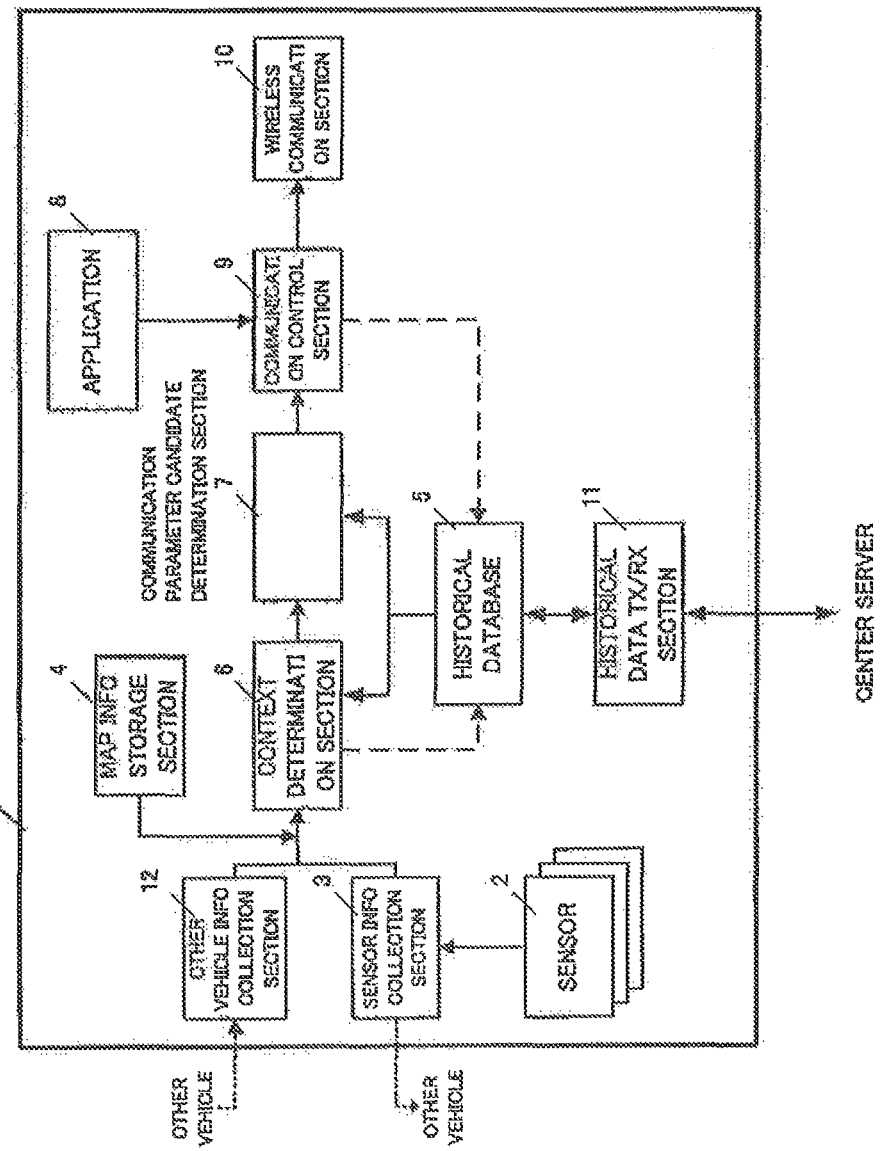
FIG. 1 is a block diagram showing the functional configuration of a wireless communication device according to a first embodiment.

FIG. 1 is a schematic view showing the functional configuration of the wireless communication device according to the present embodiment. The wireless communication device 1 includes a plurality of sensors 2, a sensor information collection section 3, a map information storage section 4, a historical database 5, a context determination section 6, a communication parameter candidate determination section 7, an application program 8, a communication control section 9, a wireless communication section 10, a historical data transmission/reception section 11, and an other vehicle information collection section 12. Note that each of the functional sections such as the sensor information collection section 3, the context determination section 6, the communication parameter candidate determination section 7, and the communication control section 9 can be implemented as, e.g., an FPGA (Field Programmable Gate Array), but it may also be implemented as an ASIC (Application Specified Integrated Circuit) or an MPU (Micro Processor Unit). Thus, each functional section may be implemented only by hardware, and may also be implemented by execution of a computer-readable program stored in a non-transitory storage device by a processor (computer).

Each of the sensors 2 is a sensor for collecting information on a vehicle on which the wireless communication device 1 is mounted and the environment in which the vehicle is positioned. Examples of the sensor 2 include a GPS (Global Positioning System) device, a speed sensor, an acceleration sensor, a steering angle sensor, a brake sensor, a milliwave radar, a laser radar, an ultrasonic sensor, an external camera, an infrared camera, a rain detection sensor, a brightness sensor, and a fuel/battery level sensor. It is possible to detect the current location (latitude, longitude, and altitude) of the vehicle by the GPS device, and grasp characteristics of the current location (urban, suburban, or rural area, and highway, national road, or general road) by combining the current location with map information. The milliwave radar, the laser radar, and the ultrasonic sensor allow grasping of distances with other vehicles or objects. It is also possible to grasp the distance with other vehicles or objects using the external camera, and it is also possible to acquire the number of surrounding vehicles. The infrared camera is used for detecting surrounding objects at night. As the rain detection sensor, what is called a rain sensor may be used and a sensor for detecting ON and OFF of a wiper may also be used. As the brightness sensor, a sensor having a light receiving element may be used and a sensor for detecting ON and OFF of a light may also be used.

In addition, as the sensor 2, wireless communication means can be included. For example, the wireless communication means may receive various information transmitted from, e.g., a roadside unit such as, e.g., traffic information and weather information. Further, the roadside unit may acquire a traffic volume (the number of vehicles) and an average moving speed using a camera and a vehicle speed sensor and notify the vehicle of them via wireless communication. In a case where each vehicle (vehicle-mounted wireless communication device) transmits information periodically, the wireless communication means of the wireless communication device 1 receives the communication, and the number of vehicles in the vicinity can be thereby grasped.

The sensor information collection section 3 collects sensor information from the plurality of the sensors 2, and transfers the sensor information to the context determination section 6.

The sensor information collected by the sensor information collection section 3 is also broadcast to the surrounding vehicles by vehicle-to-vehicle communication. This broadcasting can be performed periodically (e.g., every 100 millisecond).

The other vehicle information collection section 12 receives the sensor information transmitted from other vehicles, and transfers the sensor information to the context determination section 6. Thus, the sensor information collected by the individual vehicles is broadcast, the surrounding vehicles receive the sensor information, and each of the vehicles can thereby acquire the sensor information measured by the surrounding vehicles.

Note that, in the present description, the wording "sensor information" is used to mean "combination of a plurality of sensor information items" for simplification of the description. However, this does not apply in a case where it is stated explicitly that the individual sensor information items are denoted or in a case where it is clear that the individual sensor information items are denoted from contexts. In addition, the "sensor information" includes not only information measured by the sensors of the host vehicle but also information measured by the sensors of the other vehicles.

In the map information storage section 4, map information inclusive of information on roads and buildings is stored. As the map information, information on characteristics of each area such as, e.g., the traffic volume, the average moving speed, a wireless communication amount, and the usage state of frequencies may be stored. In addition, several categories such as urban, suburban, and rural areas may be appropriately set and information indicative of the category to which each area belongs may also be stored as the map information.

In the historical database 5, a context, a communication parameter, and a communication performance are stored in association with each other. Specifically, the communication performance when communication is performed by using a given communication parameter in a given context is stored. Note that, although the database is named the "historical" database, it is not necessary to store the communication performance of the actually performed communication. For example, a value obtained by performing a statistical process on the communication performance of the actually performed communication may be stored. In addition, the communication performance obtained by simulation or the like without performing the actual communication may also be stored.

A method for acquiring data for creating the historical database 5 (hereinafter referred to as historical data) includes several methods. As shown in FIG. 2A, the first method is a method in which the historical data is generated based on the communication that a wireless communication device 100 has performed, and the historical data is stored in the historical database 5. The wireless communication device 100 can obtain the surrounding situation of the device from the sensors 2 of the device. Regarding the surrounding situation of a wireless communication device 200 of a communication partner, the sensors of the communication partner 200 acquires the surrounding situation thereof, and the wireless communication device 100 can acquire the surrounding situation via the communication. The communication parameter and the communication performance can be acquired in the wireless communication device 100. Consequently, the wireless communication device 100 can generate historical data 101 and store the historical data 101 in the historical database 5.

As shown in the lower left part of FIG. 2B, the second method is a method in which data generated based on the communication performed by other wireless communication devices 210 and 220 is acquired via wireless communication directly from the wireless communication device 210 or 220 or via a server device 230. Similarly to the case described above, data 215 on the surrounding situation, the communication parameter, and the communication performance of the communication between the wireless communication devices 210 and 220 can be generated in the wireless communication devices 210 and 220. The wireless communication device 210 or 220 transmits the historical data 215 to the wireless communication device 100 via wireless communication, and the wireless communication device 100 stores the historical data in the historical database 5. The historical data may be transmitted to the server device 230 from the wireless communication device 210 or 220, the historical data from a plurality of the wireless communication devices may be accumulated in the server device 230, and the accumulated historical data may be distributed to the wireless communication device 100.

As shown in the lower right part of FIG. 2B, the third method is a method in which a case where the communication is performed by using any communication parameter between vehicles in any surrounding situation is simulated by using a computer 300, and the communication performance is calculated. Consequently, the computer 300 can acquire the relationship among the surrounding situation, the communication parameter, and the communication performance in a case where wireless communication is executed. The computer 300 transmits the data to the wireless communication device 100 via wireless communication or other methods, and the wireless communication device 100 stores the historical data in the historical database 5. Though not shown in the drawing, similarly to the case described above, the historical data may also be distributed to the wireless communication device 100 via the server device.

For achieving the object of determining the communication parameter corresponding to the context, it is sufficient for the communication performance when the communication is performed using a specific communication parameter to be stored, and the historical information itself does not necessarily need to be stored. That is, it is sufficient only if the result of learning based on the historical information is stored. However, in the present embodiment, it is an object to measure the communication performance of the wireless communication during operation to perform further learning, and hence the historical information is stored in the historical database 5. Thus, the historical database 5 in the present embodiment serves as a learning database and historical information storage means in the present invention.

Herein, as the communication performance, any index can be adopted as long as the index indicates the performance of the communication. As examples of the communication performance, there can be adopted throughput, round trip time (RTT), signal to noise ratio (SNR), bit error rate (BER), and packet error rate (PER).

Note that various methods can be used to define the "context".

One of the methods is a method in which the combination of acquired sensor information items is used as one context. That is, in a case where there are N sensors in each of the vehicle on the transmission side and the vehicle on the reception side, one context is defined by the combination of 2N values. According to this method, the context is considered to be identical with the sensor information so that its implementation is easy. In addition, original data is used without being altered, and hence the historical information can be effectively used. However, many historical data items need to be retained, and hence a large storage capacity is required.

Another method is a method in which a designer defines the context based on several sensor information items. As a simple example, four situations are assumed for each of the vehicle on the transmission side and the vehicle on the reception side with the number of surrounding vehicles (many/few) and the moving speed of the vehicle (fast/slow) used as criteria, and 16 contexts as the combinations of these are defined. It is a matter of course that three or more of the sensor information items may be used, and each sensor information item may be divided into more levels. This method is advantageous in that the number of types of the context can be set to the appropriate number. However, in a case where the definition of the context is not appropriate, the optimum communication parameter may not be selected.

Further, as another method, there can be considered a method in which the definition of the context is automatically set based on the collected sensor information and the communication performance. By applying an appropriate distance measure to the sensor information (the combination of a plurality of the sensor information items), the distance (similarity) between the sensor information items can be defined. Similarly, by applying an appropriate distance measure to the communication performance, the distance (similarity) between the communication performances can be defined. According to this method, similar sensor information items that allow similar communication performances to be obtained when the communication is performed by using the same communication parameter are considered to be identical contexts. The required degree of the similarity for determining the identical contexts may be appropriately designed according to required accuracy. Note that, even when the communication is performed in the same environment (sensor information) by using the same communication parameter, variations occur in the communication performance. Consequently, as the collection of the historical data progresses, the contexts that have been determined as identical contexts can be judged as different contexts, and can also be judged the other way around. This process method increases the arithmetic calculation amount, but can define the context more appropriately.

Note that the context does not need to be exclusive. That is, the context may be defined such that one situation belongs to a plurality of the contexts. Consequently, each of the number of surrounding vehicles (many/few), location (urban area/suburban area/rural area), road shape (straight/curve, multiple lanes/narrow), traffic situation (smooth/heavy), vehicle running situation (high speed/low speed, accelerated/decelerated), and time and date (time zone, date, day, season) can be defined as one context.

In the historical database 5, with regard to the communication performed by the wireless communication device 1, the context, the communication parameter, and the communication performance are stored. It is preferable to transmit the historical data stored in the historical database 5 to a center server when the wireless communication environment is excellent. Conversely, it is also preferable to acquire the historical data from the center server. In particular, in a case where information on a given context is not stored in the historical database 5, it is preferable to contact the center server to acquire information on the communication parameter and communication performance of the context.

The context determination section 6 determines the current surrounding situation (context) of each of the host device and the device of the communication partner based on the sensor information acquired via the sensor information collection section 2. The method for determining the context from the sensor information will be apparent by referring to the methods for defining the context described above.

Figure 3:
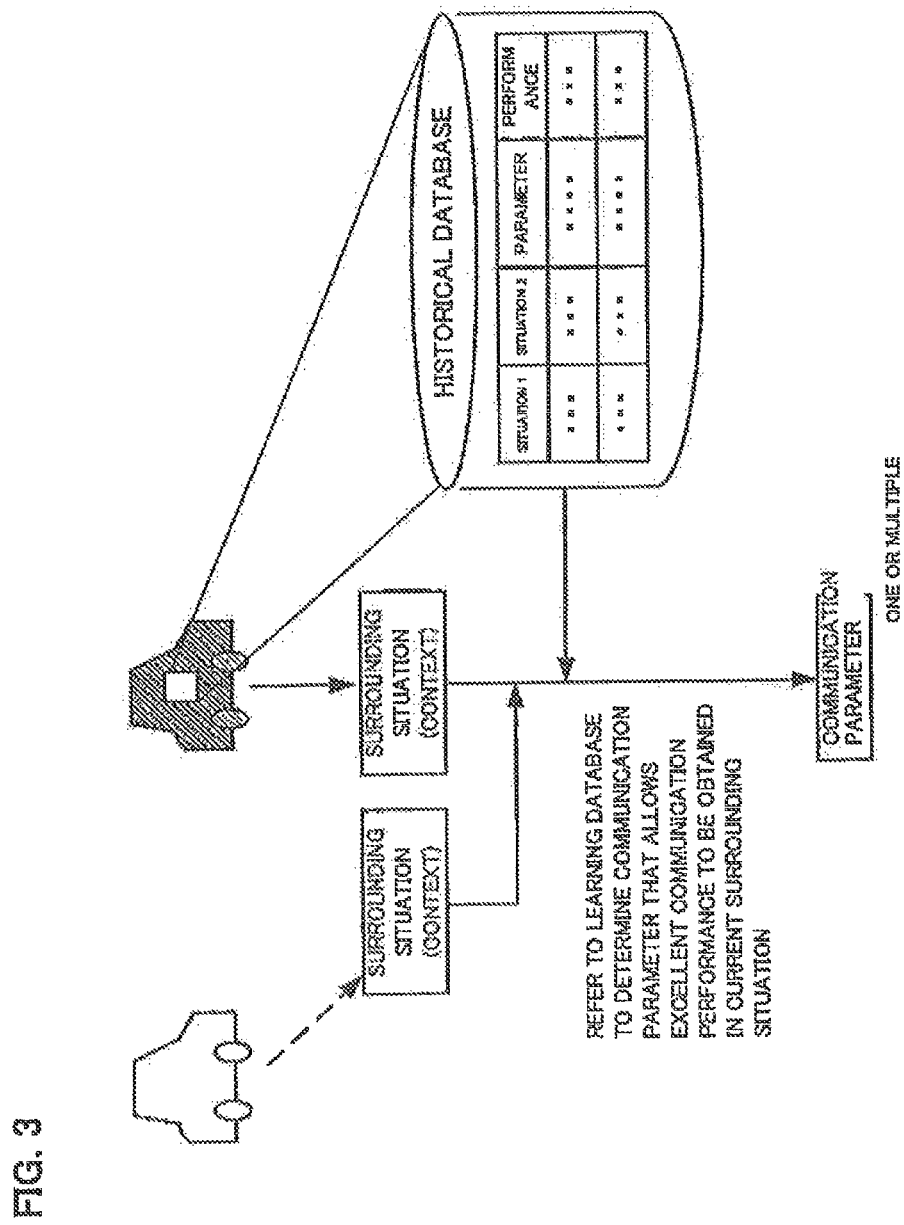
FIG. 3 is a view for explaining the selection of a candidate for a communication parameter in the first embodiment.

As shown in FIG. 3, the communication parameter candidate determination section 7 lists several candidates for the communication parameter that are preferable in the current context by referring to the historical database 5 by using the surrounding situation (context) of the host device and the surrounding situation (context) of the device of the communication partner. Note that it is preferable to adaptively select one or a plurality of the communication parameters for each of a plurality of protocol layers (transport layer, network layer, data link layer, and physical layer). Herein, the communication parameter candidate determination section 7 determines the candidates for the communication parameter so as to include the best selection by excluding the communication parameter that is not preferable in the current context rather than determining the optimum communication parameter in the current context. Note that the number of values of one communication parameter selected as the candidates may be appropriately designed.

An example of the communication parameter that is not preferable includes a high transmission rate (high modulation level) in an urban area. In the urban area, the influence of multipath is increased, and hence the communication cannot be performed when the modulation level is extremely high. Consequently, in the urban area as the context, with regard to the modulation level (transmission rate) as the communication parameter, the communication parameter candidate determination section 7 selects, as the candidates, the modulation levels from which the highest modulation level (e.g., 64 QAM) is excluded.

In the context in which the number of surrounding vehicles is large, high transmission power is not preferable because it causes interference. Conversely, in the context in which the number of surrounding vehicles is small, low transmission power is not preferable because the possibility that the communication is not established is increased.

Note that such decisions are preferably made in consideration of the situations of both of the host vehicle and the vehicle of the communication partner. For example, there is a case where the number of surrounding vehicles of the host vehicle is small, but the number of surrounding vehicles of the vehicle of the communication partner is large. In this case, it is possible to increase communication capacity (or communication frequency) in terms of the surrounding situation of the host vehicle only. However, considering the situation of the vehicle of the communication partner, it is preferable to suppress the transmission capability. Consequently, in a case where the number of surrounding vehicles of the host device or the device of the communication partner is large, the communication capability is suppressed. Thus, when one of the devices is in a given situation, a specific communication parameter is adopted. In addition, it is possible to determine that a specific communication parameter is adopted in a case where both of the host device and the communication partner are in a specific situation.

Figure 4:
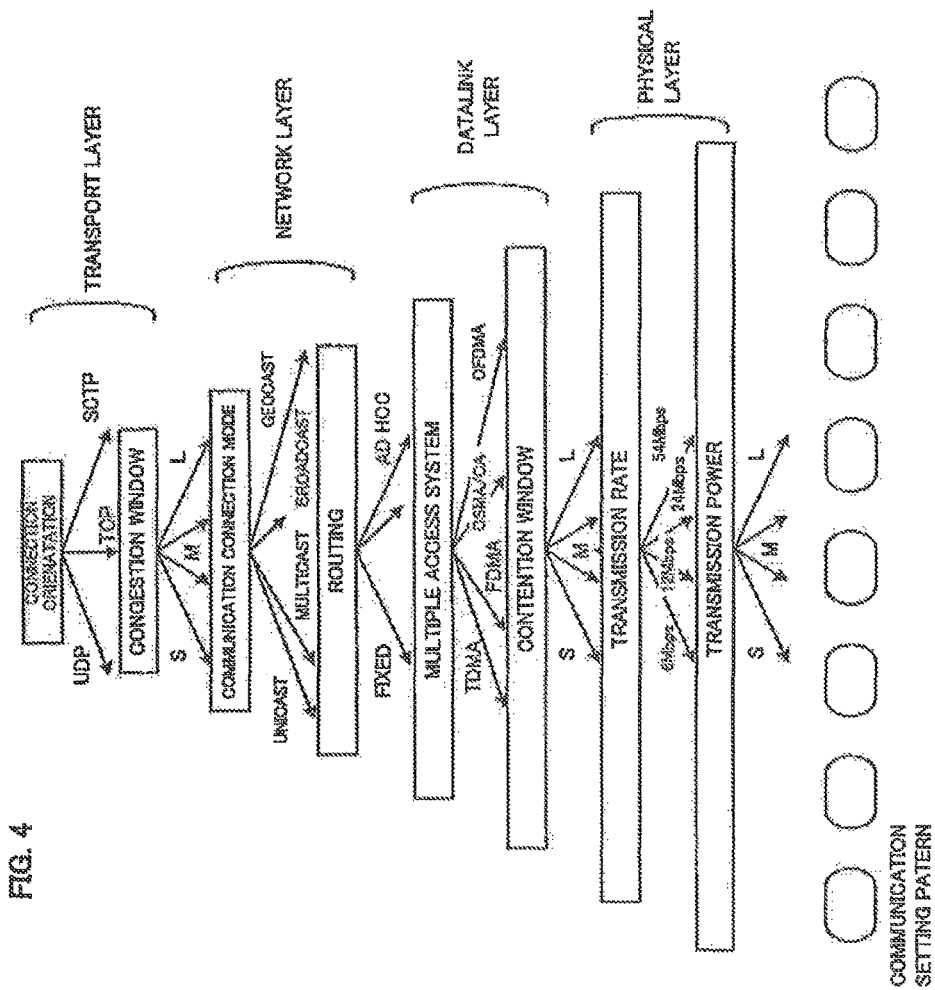
FIG. 4 is a view for explaining the selection of the candidate for the communication parameter in the first embodiment.

The communication parameter candidate determination section 7 excludes the selection that is not preferable from one or a plurality of parameters for each protocol stack. As shown in FIG. 4, the communication parameter candidate determination section 7 determines the combination of the communication parameters obtained by excluding the communication parameter that is not preferable for each protocol stack, and notifies the communication control section of the combination.

The application program 8 notifies the communication control section 9 of QoS (Quality of Service) of the wireless communication. For example, in the case of the application related to vehicle safety, it is necessary to perform low-delay reliable communication though its throughput is low. Conversely, in the case of the application that sends entertainment information, it is preferable to perform communication having high throughput though its reliability is low. The application program 8 notifies the communication control section 9 of such requirements of the application.

The communication control section 9 determines the appropriate communication parameter from among the candidates for the communication parameter sent from the communication parameter candidate determination section 7 according to the requirement of the application program 8. This selection can be implemented by using conventional adaptive protocol technologies. At this point, since the communication parameter that is not preferable apparently is excluded from the candidates, the communication performance is improved by performing the communication by using the determined communication parameter.

Note that the communication control section 9 measures the communication performance obtained as the result of performing the communication by using the determined communication parameter. Subsequently, the communication control section 9 stores the communication parameter used in the communication and the context in the communication in the historical database 5.

<Process>
[Historical Data Collection Process]

First, the method for creating the historical database 5 (learning process) will be described. Each of FIGS. 5A and 5B is a flowchart showing an example of the method for creating the historical database 5.

Figure 5:
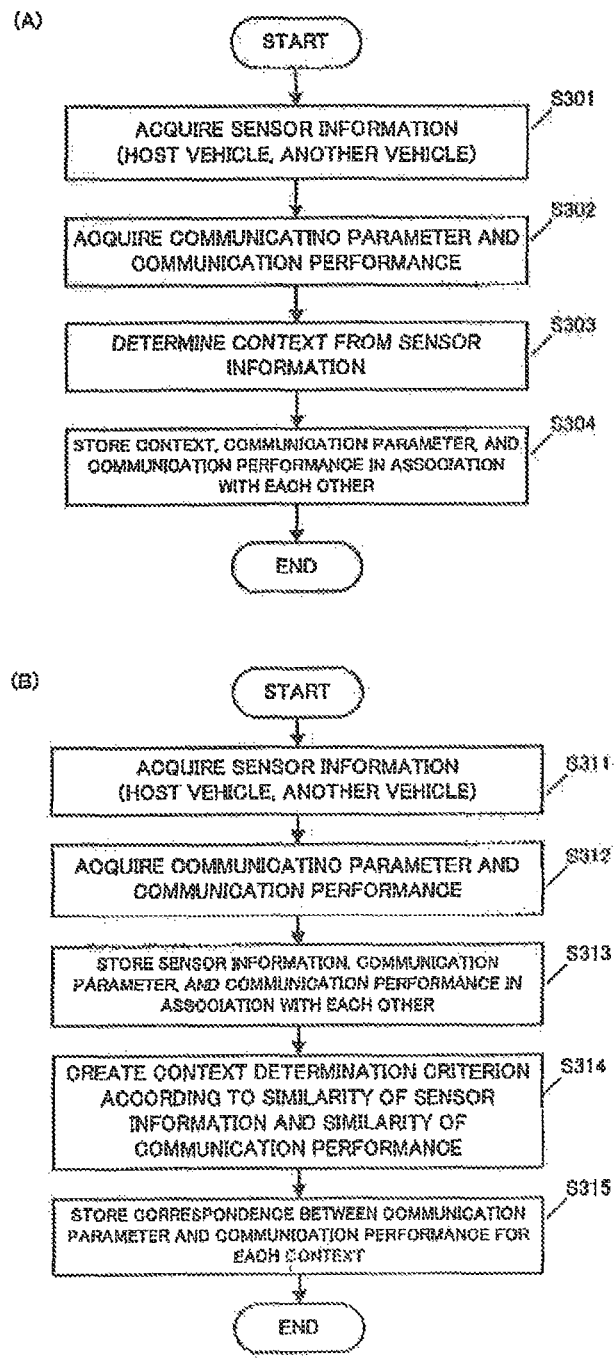
FIG. 5 is a flowchart showing a historical database creation process in the first embodiment.

FIG. 5A shows the method for creating the historical database 5 in a case where the definition of the context is given in advance. First, the current sensor information of the host vehicle is acquired from the plurality of the sensors 2, and the current sensor information of another vehicle is acquired from the other vehicle information collection section 12 (S301). In addition, the communication parameter used in the wireless communication and the communication performance in a case where the communication is performed by using the communication parameter axe acquired (S302). Note that, although it is preferable to use information in a case where the wireless communication device 1 is actually used as the sensor information, the communication parameter, and the communication performance, the information may also be acquired by computer simulation.

From the sensor information of the host vehicle and another vehicle, acquired in this manner, the current context is determined according to the predetermined definition (S303). When the current context is determined from the sensor information in this manner, the context, the communication parameter, and the communication performance are stored in the historical database 5 in association with each other (S304). Thus, by accumulating the communication performances of various contexts and communication parameters, it becomes possible to grasp the communication performance in a case where any communication parameter is used in any context.

FIG. 5B shows the method for creating the historical database 5 in a case where the definition of the context is changed according to the measurement result. First, the current sensor information of the host vehicle is acquired from the plurality of the sensors 2, and the current sensor information of another vehicle is acquired from the other vehicle information collection section 12 (S311). In addition, the parameter used in the wireless communication and the communication performance in the case where the communication is performed by using the communication parameter are acquired (S312). Subsequently, the acquired sensor information, communication parameter, and communication performance are stored in the historical database 5 in association with each other (S313).

Next, based on the similarity of the sensor information and the similarity of the communication performance, similar sensor information items that allow similar communication performances to be obtained when the communication is performed by using the same communication parameter are determined as identical contexts (S314). The similarity of the sensor information or the communication performance can be defined by applying the appropriate distance measure to these information items. Specifically, the determination of the context can be performed by determining a classifying parameter of a classifier using machine learning such as neural network, support vector machine (SVM), or Bayesian filter. In addition, it is also possible to obtain a decision tree using the machine learning and determine the context by using the obtained decision tree.

When the definition of the context is determined, the correspondence between the communication parameter and the communication performance is stored for each context (S315). Herein, as the communication performance, a value obtained by the actual communication may be used, but a value obtained by statistical processes such as average and variance is also preferable.

[Communication Parameter Determination Process]

Figure 6:
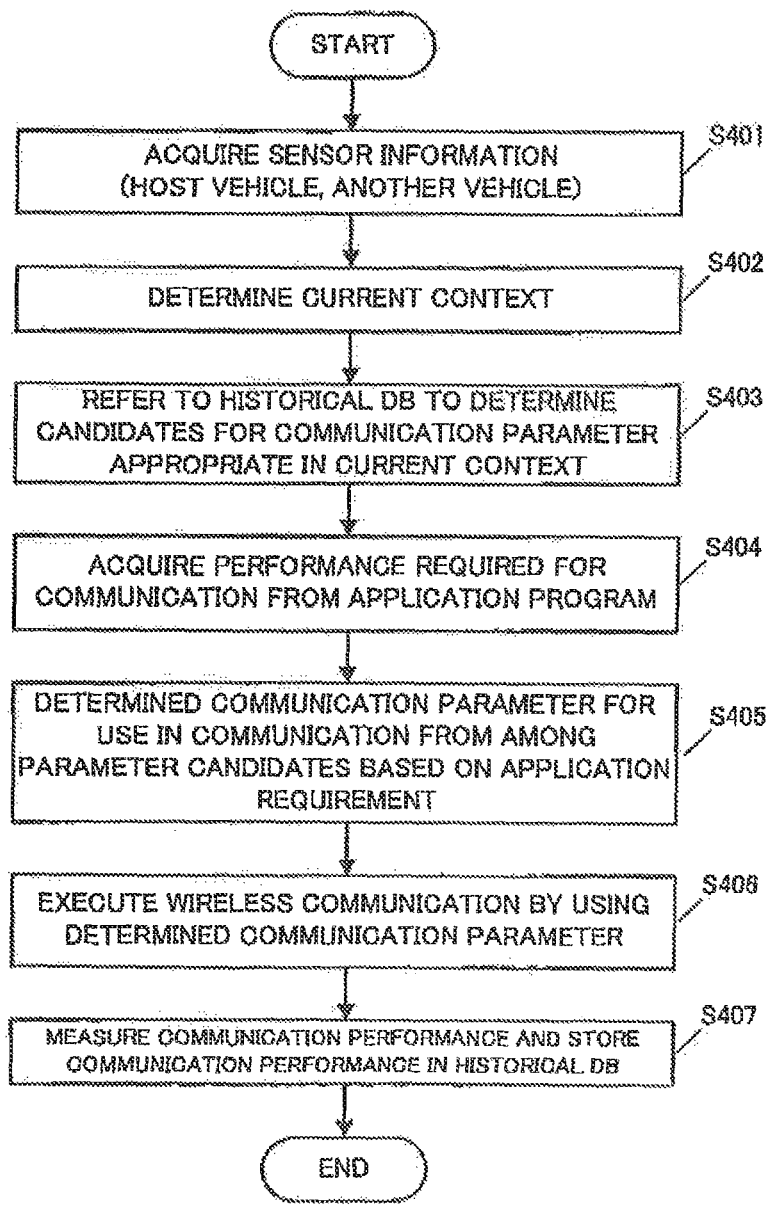
FIG. 6 is a flowchart showing a communication parameter determination process in the first embodiment.

Next, a communication parameter determination process will be described with reference to the flowchart of FIG. 6. First, the sensor information collection section 3 acquires the sensor information from the plurality of the sensors 2 (S401), and the context determination section 6 determines the current context based on the acquired sensor information (S402). The communication parameter candidate determination section 7 refers to the historical database 5 to determine the candidates for the communication parameter that are appropriate in the current context (S403). This process is performed by excluding the communication parameter inferior in communication performance from among the communication parameters and leaving the communication parameter superior in communication performance.

In a case where the communication performance for each communication parameter in the current context is not stored in the historical database 5, the communication performance in the current context may be acquired from the center server via the historical data transmission/reception section 11.

The communication control section 9 acquires the performance required for the communication from the application program 8 (S404), and determines the combination of the communication parameters corresponding to the application requirement from among the candidates selected in Step S403 (S405). The communication control section 9 executes the wireless communication by using the determined communication parameters (S406).

In order to update the historical database 5 based on the actually performed communication, the communication control section 9 measures the performance of the communication, and stores the measured performance in the historical database 5 together with the current context and the communication parameter used in the communication (S407). The detail of this process is equal to those in FIGS. 5A and 5B so that the detailed description thereof will be omitted.

<Operation Example>

Hereinbelow, a description will be given of a specific example of a process of adaptively changing the communication parameter based on the context. Note that, in the present embodiment, the communication parameter is selected without replacing the existing protocol stack.

First, a description will be given of the selection of the communication parameter in the physical layer and the data link layer based on an SNR measurement value. There is known a technology for adapting the transmission rate, a modulation scheme, and a coding scheme based on the SNR measurement value. In the present embodiment, according to the current context, the selectable modulation scheme and coding scheme are limited, and the adaptive protocol selects the appropriate modulation scheme and coding scheme from among the limited combinations based on the SNR measurement value. For example, it is known that, in the urban area, even in a case where the SNR measurement value is high, high communication performance cannot be obtained when the high-order modulation/coding scheme is adopted. Consequently, in the context in which at least one of the host device and the device of the communication partner is located in the urban area, the communication parameters from which the high-order modulation/coding scheme is excluded are sent to the communication control section as the candidates, and the communication control section selects the modulation/coding scheme from among the received candidates. With this, it becomes possible to avoid the high-order modulation/coding scheme in the urban area, and it is possible to improve the communication performance in the urban area as the context.

Next, a description will be given of a process of adapting the value of the contention window in CSMA/CA (Carrier Sense Multiple Access/Collision Avoidance) according to the number of surrounding wireless communication devices. CSMA/CA is a protocol of the MAC layer, and is a scheme in which each wireless communication device senses the availability of a carrier before performing packet transmission, and starts the transmission in a case where the carrier is not used for a predetermined time. Herein, the sensing time is determined for each wireless communication device by using random numbers and packet collision between terminals is thereby avoided. The range of the random numbers corresponds to the contention window. The contention window (CW) depends on the number of times of retransmission during the packet transmission, and is represented by $CW=(CW_{min}+1)*2^n-1$. In the expression, n is the number of times of retransmission, and $CW_{min}$ is the initial value of CW.

In such a scheme, a problem arises in that overall total throughput is reduced as the number of terminals on the carrier is increased. It is reported that, when the packet collision is repeated, the packet transmission requires a time period maximum 80 times as long as that of a case where there is no collision (when the number of terminals is 40).

The above problem is thought to arise because the initial value of the contention window is uniquely determined according to the wireless system irrespective of the number of wireless communication devices (existence density). That is, the probability of overlap of the random number is increased with an increase in the number of terminals, and unnecessary retransmission is performed.

Consequently, by properly setting the initial value of the contention window according to the number of wireless communication devices, it is possible to avoid the packet collision and reduce waiting time caused by the data retransmission so that it is possible to suppress a reduction in overall throughput.

In the present embodiment, information that the value of the contention window that enhances the communication performance is increased as the number of surrounding wireless communication devices is larger is accumulated in the historical database. Consequently, the communication parameter candidate determination section of the present embodiment determines, as the candidates, the range of the value of the contention window from which the range apparently inferior in communication performance is excluded according to the number of surrounding wireless communication devices as the context information. The communication control section determines the appropriate value of the contention window from the candidates according to the application requirement, and uses the value of the contention window in the wireless communication. With this, it is possible to avoid the packet collision and suppress a reduction in overall throughput.

Note that, as a similar operation example, it is also possible to determine which frequency band in the white space is used by using the historical data. In the historical database, the communication performances of the individual frequency bands are stored for each location (further, for each time). Note that the communication performance includes information indicative of the availability of the frequency band. Consequently, the communication parameter candidate determination section of the present embodiment can narrow the candidate for the appropriate frequency band according to the current context.

Although the above description has described the example in which one communication parameter is adaptively selected according to the context, a person skilled in the art would easily understand that a plurality of the communication parameters can be adaptively changed according to the context by the combination of the above methods or other methods.

<Operation and Effect of Embodiment>

According to the present embodiment, it is possible to adaptively change the communication parameter and improve the performance and reliability of the communication based on the context obtained from various sensor information. In addition, according to the present embodiment, it is possible to change not only the specific communication parameter in the specific communication protocol but also any communication parameter. The number of communication parameters to be changed and the number of sensor information items serving as the base for determination of the context are not limited, and hence the present embodiment is excellent in scalability. In addition, the communication protocol itself is not changed, and hence the present embodiment has the advantage of being easily combined with existing technologies.

Second Embodiment

In the first embodiment, in consideration of the current situations of the host device and the device of the communication partner, the communication parameter that is appropriate in the situations is determined. However, in the present embodiment, the communication parameter is determined based only on the situation of the host device. That is, in a wireless communication device according to the present embodiment, the surrounding situation of the wireless communication device is determined from information obtained from a plurality of sensors thereon, and candidates for the communication parameter that are appropriate in the determined surrounding situation are determined by referring to the learning database.

Figure 7:
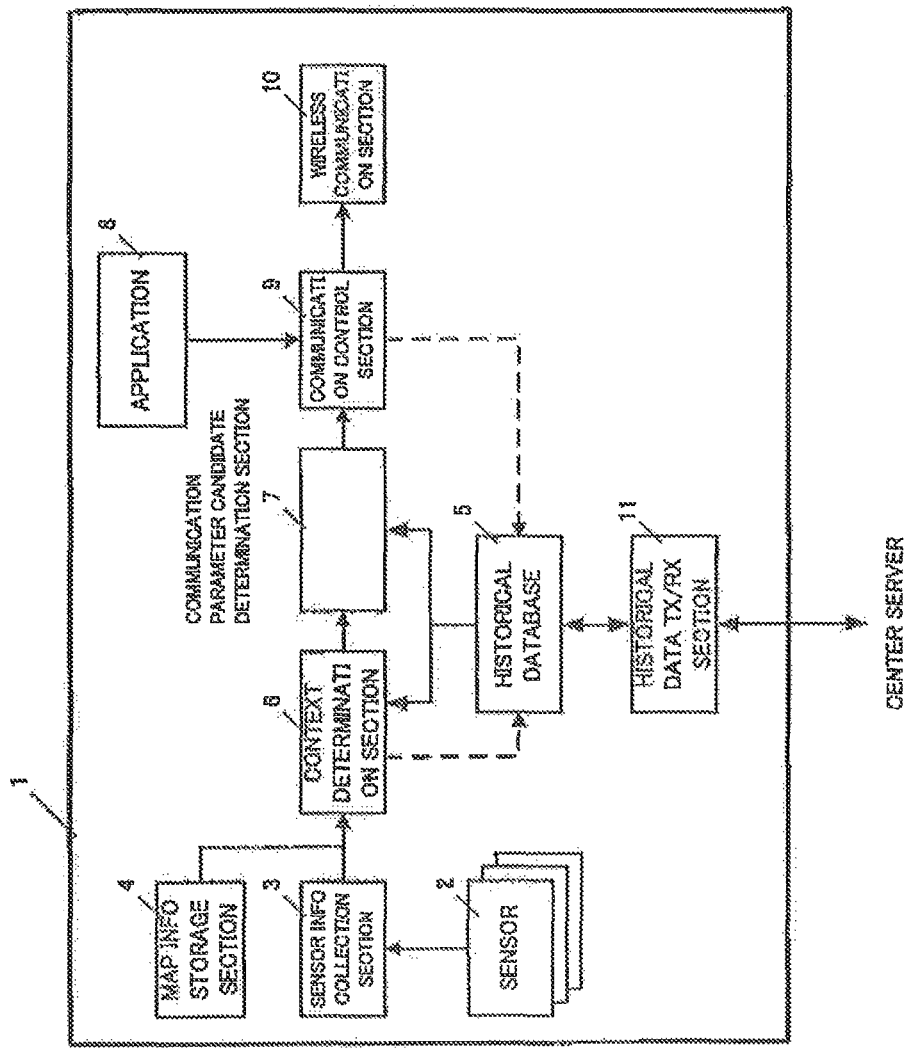
FIG. 7 is a block diagram showing the functional configuration of a wireless communication device according to a second embodiment.

FIG. 7 is a view showing the functional configuration of the wireless communication device according to the present embodiments. When compared with the first embodiment (FIG. 1), the second embodiment is different from the first embodiment in that the other vehicle information collection section 12 is omitted, and the configuration of the second embodiment is otherwise the same as that of the first embodiment.

Figure 8:
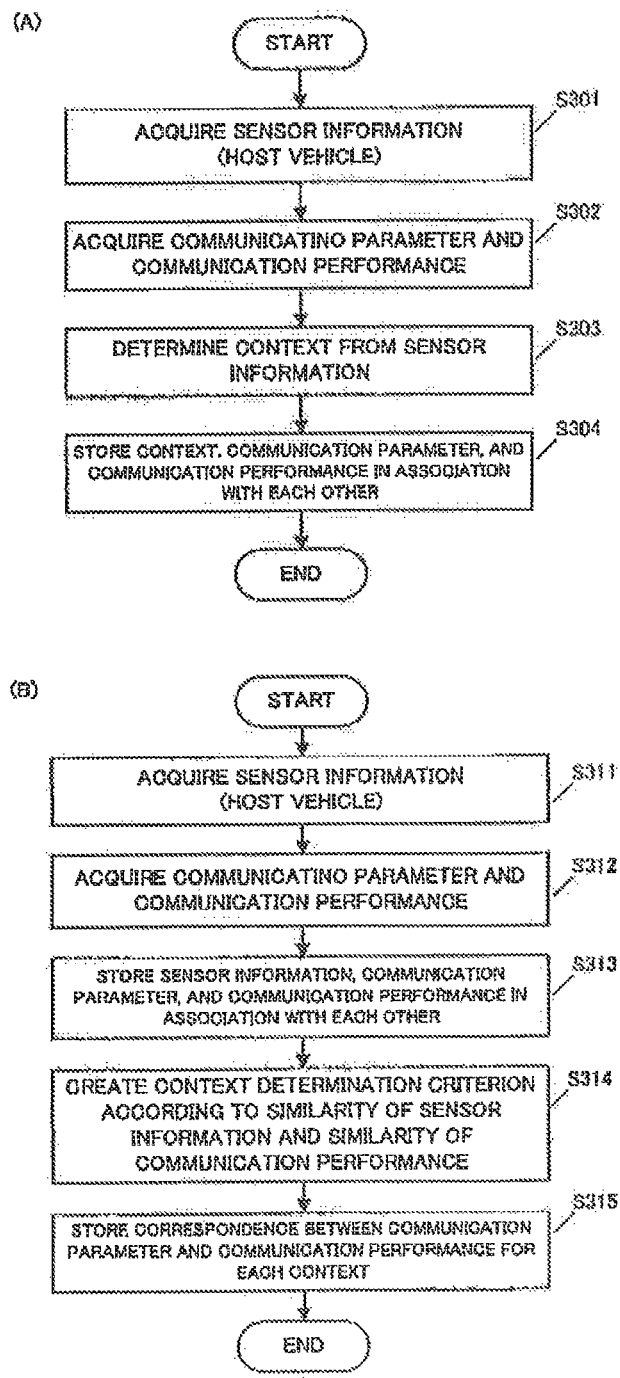
FIG. 8 is a flowchart showing the historical database creation process in the second embodiment.

In addition, the details of processes according to the present embodiment are basically the same as those of the first embodiment. Each of FIGS. 8A and 8B is a flowchart showing an example of a method for creating the historical database 5 (learning process) in the present embodiment. Although the processes are also similar to those of the first embodiment (FIGS. 5A and 5B), the processes of the second embodiment are different from those of the first embodiment in that the sensor information acquired in Step S601 and Step S611 is only the sensor information of the host vehicle. In addition, the second embodiment is different from the first embodiment in that the determination of the context is not based on the surrounding situations of the host device and the device of the communication partner but is based only on the surrounding situation of the host device. Accordingly, the second embodiment is different from the first embodiment in that the definition of the context is based only on the surrounding situation of the host device, and a person skilled in the art would understand the method for defining the context based only on the surrounding situation of the host device from the above description.

Figure 9:
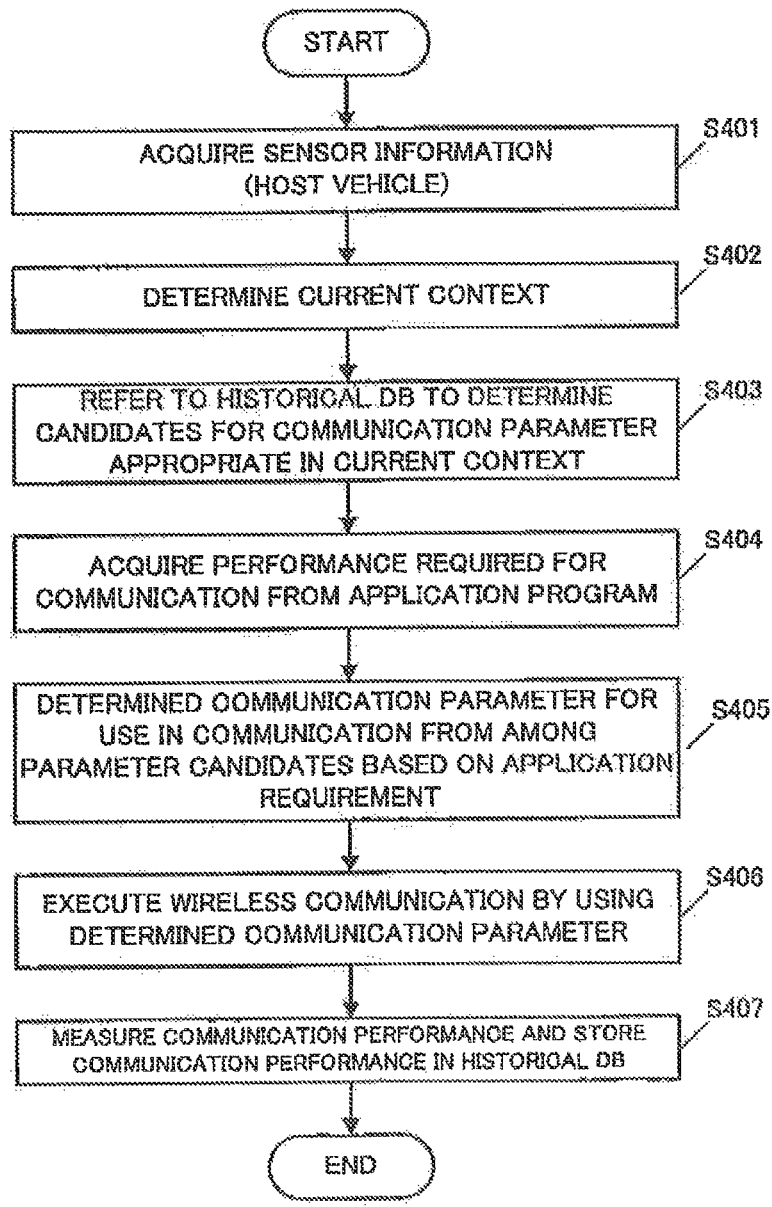
FIG. 9 is a flowchart showing the communication parameter determination process in the second embodiment.

FIG. 9 is a flowchart showing an example of a communication parameter determination process in the present embodiment. The process is similar to the process in the first embodiment (FIG. 6), but the process is different from the process in the first embodiment in that the sensor information acquired in Step S701 is only the sensor information of the host vehicle. In Step S702, the context is determined based only on the sensor information (surrounding situation) of the host device. The detail of the process subsequent to this is the same as that of the first embodiment.

The configuration and the detail of the process other than those described above are the same as these of the first embodiment.

According to the present embodiment, although accuracy is lower than that in the first embodiment, it is possible to determine the appropriate communication parameter spending to the surrounding situation by the simpler process.

Third Embodiment

In the first and second embodiments described above, the communication parameter and the communication performance are associated with each other and stored for each context, and the communication parameter that improves the communication performance is selected in each context. In the present embodiment, the context is defined on the basis of the communication performance. That is, the context is defined such that the communication parameters that allow the best communication performance are identical with each other in one context.

Hereinbelow, a description will be given based on a specific example. For simplification of the description, only the modulation scheme and packet length are considered as the communication parameters. Examples of the modulation scheme include three types of BPSK, QPSK, and 16QAM, and examples of the packet length include 2 types of 100 bytes and 1000 bytes. These are combined and six combinations are assumed.

As the sensor information items of the vehicle, three types of the reception power, the moving speed, and a channel mode are used. The channel mode indicates, e.g., whether the area is the urban area, the suburban area or the rural area, and whether the road is the highway, the national road, or the general road. Herein, consideration is given to one-to-one communication, these sensor information items are used for both of the transmission side and the reception side.

Figure 10:
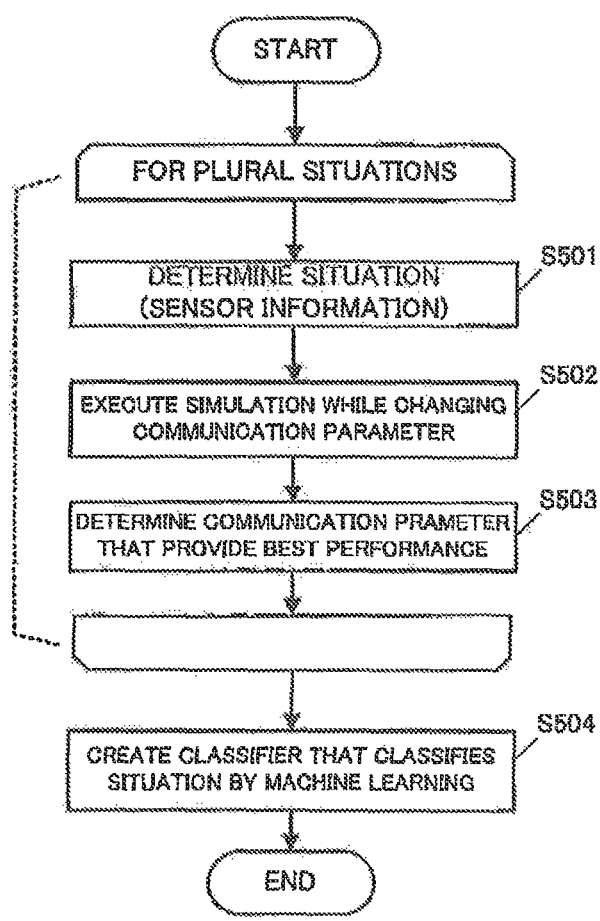
FIG. 10 is a flowchart showing a classifier creation process in a third embodiment.

Next, a description will be given of a process of creating the historical database 5 (learning process) based on the sensor information and the communication parameters described above with reference to FIG. 10. Herein, although an example in which simulation is used instead of actual measurement is described, the same process can be executed by using the actual measurement.

First, any situation is assumed (S501). That is, the reception power, the moving speed, and the channel mode are determined for both of the vehicles that perform the communication. Subsequently, in this situation, the communication performances in a case where adoptable communication parameters (six combinations mentioned above) are adopted are calculated by a communication simulator (S502). Note that the same communication performances as those described in the first embodiment can be adopted. In addition, as the communication simulator, any existing simulator can be used. Then, the communication parameter that allows the best communication performance in the situation assumed in Step S501 is determined (S503). The process from Step S501 to Step S503 is repeated the number of times corresponding to the number of assumed situations.

Next, a classifier that determines which communication parameter is optimum in a case where any situation is given is created by machine learning with data obtained by the above process used as training data (S504). That is, the combination of the communication parameters is used as one class, and a multi-class classifier that classifies the situation into six classes is created on the basis of the communication parameter that allows the best communication performance. The creation of such a classifier is allowed by the existing description and, for example, methods such as the neural network, the SVM (support vector machine), the Bayesian filter, or the decision tree may appropriately be adopted.

Figure 11:
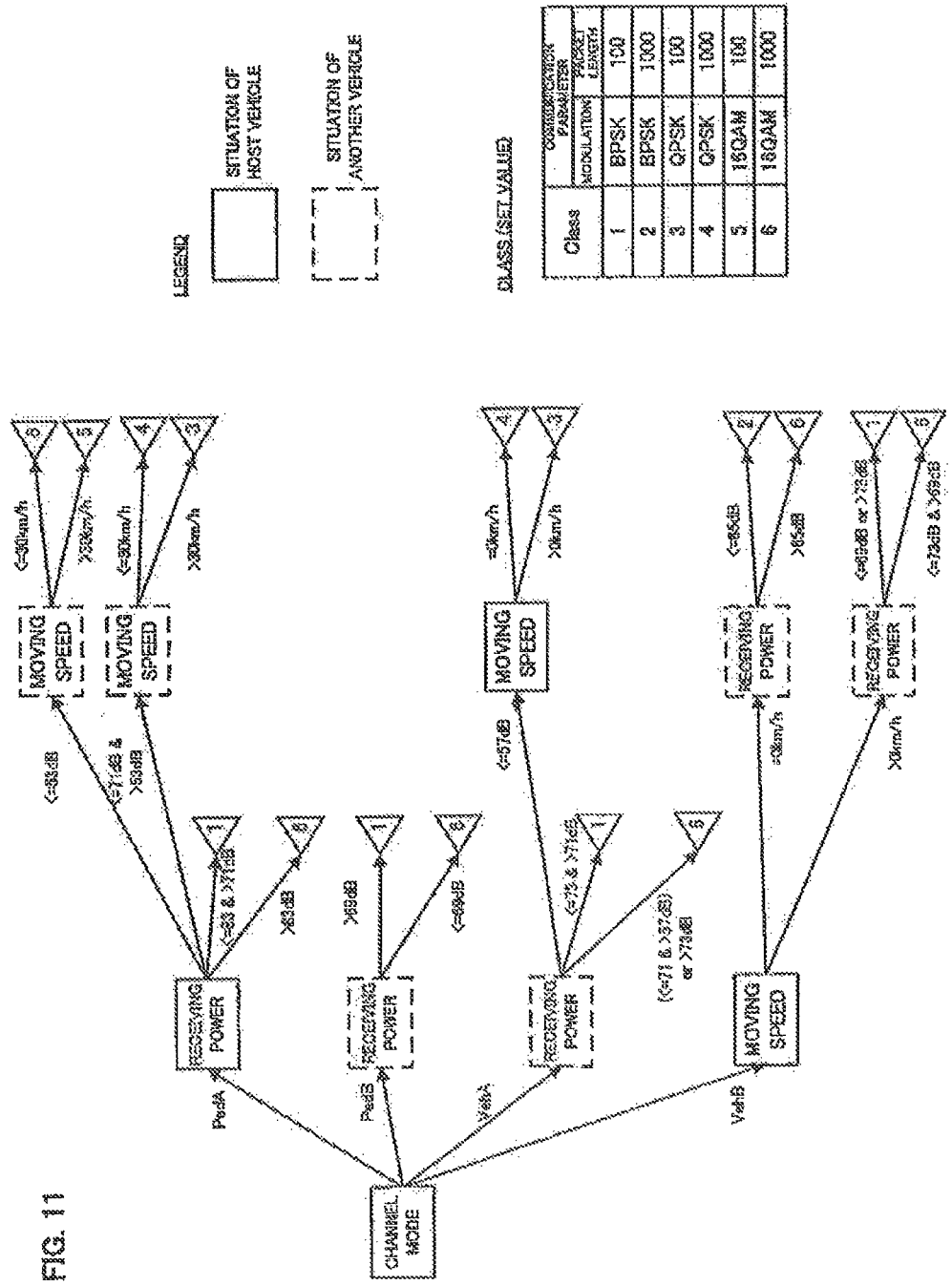
FIG. 11 is a view showing an example of the classifier (decision tree) created in the third embodiment.

FIG. 11 is a view showing an example of the decision tree created by the machine learning. In the drawing, each square in a solid line indicates the situation of the host vehicle, and each square in a dotted line indicates the situation of the device of the communication partner.

According to the present embodiment, it is also possible to determine the appropriate communication parameter according to the situations of the host vehicle and the vehicle of the communication partner.

Note that, in the example described herein, one optimum communication parameter is selected according to the situations of the host vehicle and the vehicle of the communication partner. In this point, the third embodiment is different from the first embodiment in which the candidates for the appropriate communication parameter are determined according to the situation and one communication parameter is determined from among the candidates according to the requirement of the application. However, by changing the present embodiment, it is possible to realize the same configuration as that of the first embodiment. That is, similarly to the case described above, by creating the multi-class classifier by using the combination of a plurality of preferable communication parameter (or one preferable communication parameter) as one class, it is possible to determine the candidates for the communication parameter according to the situation and select the communication parameter that is actually used from among the candidates according to the requirement of the application, similarly to the first embodiment.

Although the communication performance when the communication is performed by using each communication parameter in each situation is determined by using the communication simulator, it would be apparent that it is possible to create the similar classifier by measuring the communication performance by using various communication parameters in the actual environment.

In addition, in the example described herein, although the context is determined based on the surrounding situation of the host device and the surrounding situation of the communication partner, in the present embodiment as well, the context may also be determined based only on the surrounding situation of the host device.

REFERENCE SIGNS LIST 1 wireless communication device
2 sensor
3 sensor information collection section
4 map information storage section
5 historical database
6 context determination section
7 communication parameter candidate determination section
8 application program
9 communication control section
10 wireless communication section
11 historical data transmission/reception section
12 other vehicle information collection section

The invention claimed is:

1. A wireless communication device that is associated with a vehicle and capable of changing a communication parameter to be used according to a surrounding situation, comprising:
surrounding situation determiner configured to determine a host surrounding situation of a host device based on a set of information;
communication partner surrounding situation acquirer configured to acquire a partner surrounding situation from a partner wireless communication device of a communication partner;
communication parameter determiner configured to determine candidates for the communication parameter that are appropriate in the host surrounding situation of the host device and the partner surrounding situation of the communication partner, and to determine the communication parameter for use in communication from among the candidates based on a requirement of the communications;
wireless communicator configured to perform communication by using the communication parameter determined by the communication parameter determiner; and
a learning database that stores, in association with each other, a first surrounding situation of a first wireless communication device mounted on a first vehicle, a second surrounding situation of a second wireless communication device mounted on a second vehicle, a predetermined communication parameter determined by the communication parameter determiner, and a communication performance in communication performed between the first communication device and the second communication device by using the predetermined communication parameter,
wherein the communication parameter candidate determiner determines the candidates for one or a plurality of the communication parameters for each of a transport layer, a network layer, a data link layer, and a physical layer, the one or a plurality of the communication parameters including modulation level, and the candidates for a communication parameter of modulation level include a set of modulation levels from which the highest modulation level is excluded.

2. The wireless communication device according to claim 1, further comprising a storage device that stores, in association with each other, the first surrounding situation of the first wireless communication device mounted on the first vehicle, the second surrounding situation of the second wireless communication device mounted on the second vehicle, the predetermined communication parameter, and the communication performance in communication performed between the first communication device and the second communication device by using the predetermined communication parameter,
wherein the communication parameter determiner is configured to refer to the storage device.

3. The wireless communication device according to claim 1, further comprising:
historical information storage configured to store, in association with each other, the communication parameter and the communication performance and current surrounding situations of the host device and the communication partner as historical information;
historical information transmitter configured to transmit the historical information stored in the historical information storage to a server device; and
historical information communicator configured to receive the historical information accumulated in the server device.

4. The wireless communication device according to claim 1, wherein the host surrounding situation includes a position of a host vehicle, a speed of the host vehicle, and a number of vehicles surrounding the host vehicle.

5. The wireless communication device according to claim 1, wherein the communication parameter determiner is further configured to determine the communication parameter based on the host surrounding situation and communication performance of the host device and the partner surrounding situation and the communication performance of the communication partner.

6. A wireless communication method capable of changing a communication parameter to be used according to a surrounding situation, comprising:
a surrounding situation determination step of determining a host surrounding situation of a host device by categorizing the surrounding situation;
a communication partner surrounding situation acquisition step of acquiring a partner surrounding situation from a partner wireless communication device of a communication partner;
a communication parameter determination step of determining the communication parameter for use in communication from among candidates based on a requirement of the communication; and
a wireless communication step of performing communication by using the communication parameter determined in the communication parameter determination step,
wherein the method further comprises referring to a learning database that stores, in association with each other, a first surrounding situation of a first wireless communication device mounted on a first vehicle, a second surrounding situation of a second wireless communication device mounted on a second vehicle, a predetermined communication parameter determined in the communication parameter determination step, and a communication performance in communication performed between the first communication device and the second communication device by using the predetermined communication parameter, wherein the host surrounding situation includes at least one of: a speed of a host vehicle, an acceleration of the host vehicle, or a number of vehicles surrounding the host vehicle, and wherein candidates for one or a plurality of the communication parameters are determined for each of a transport layer, a network layer, a data link layer, and a physical layer, the one or a plurality of the communication parameters including modulation level, and the candidates for a communication parameter of modulation level include a set of modulation levels from which the highest modulation level is excluded.

7. The wireless communication method of claim 6, wherein the communication parameter determination step includes referring to a storage device that stores, in association with each other, the first surrounding situation of the first wireless communication device mounted on the first vehicle, the second surrounding situation of the second wireless communication device mounted on the second vehicle, the predetermined communication parameter, and the communication performance in communication performed between the first communication device and the second communication device by using the predetermined communication parameter to determine candidates for the communication parameter that are appropriate in the host surrounding situation of the host device and the partner surrounding situation of the communication partner.

* * * * *